United States Patent
Menne et al.

(10) Patent No.: US 9,297,897 B2
(45) Date of Patent: Mar. 29, 2016

(54) ULTRASOUND INTERIOR SPACE MONITORING SYSTEM FOR A VEHICLE

(71) Applicant: DELPHI TECHNOLOGIES, INC., Troy, MI (US)

(72) Inventors: Roland Menne, Olpe (DE); Christoph Rott, Cologne (DE); Christian Esser, Gummersbach (DE)

(73) Assignee: Delphi Technologies, Inc., Troy, MI (US)

( * ) Notice: Subject to any disclaimer, the term of this patent is extended or adjusted under 35 U.S.C. 154(b) by 278 days.

(21) Appl. No.: 14/097,406

(22) Filed: Dec. 5, 2013

(65) Prior Publication Data
US 2014/0177393 A1 Jun. 26, 2014

(30) Foreign Application Priority Data

Dec. 21, 2012 (EP) ..................................... 12199077

(51) Int. Cl.
*G01S 15/58* (2006.01)
*G01S 15/04* (2006.01)
*B60Q 3/02* (2006.01)
*G01S 15/00* (2006.01)

(52) U.S. Cl.
CPC ............... *G01S 15/58* (2013.01); *B60Q 3/0279* (2013.01); *B60Q 3/0293* (2013.01); *B60Q 3/0296* (2013.01); *G01S 15/00* (2013.01); *G01S 15/04* (2013.01)

(58) Field of Classification Search
CPC .. B60Q 3/0293; B60Q 3/0296; B60Q 3/0279; G01S 15/00; G01S 15/458; G01S 15/04
See application file for complete search history.

(56) References Cited

U.S. PATENT DOCUMENTS

| | | | |
|---|---|---|---|
| 2011/0260965 A1* | 10/2011 | Kim ........................ | G06F 3/013 345/156 |
| 2012/0001875 A1* | 1/2012 | Li .......................... | G01S 7/5273 345/177 |
| 2014/0058584 A1* | 2/2014 | Weng ....................... | G06F 7/00 701/1 |
| 2014/0177393 A1* | 6/2014 | Menne ................. | B60Q 3/0293 367/89 |

FOREIGN PATENT DOCUMENTS

| | | | | |
|---|---|---|---|---|
| CN | 103885063 A | * | 6/2014 | ........... B60Q 3/0293 |
| DE | EP 1574408 A1 | * | 9/2005 | ........... B60Q 3/0296 |
| DE | 102007054139 A1 | * | 5/2009 | ........... B60Q 3/0293 |
| DE | EP 2284044 B1 | * | 12/2014 | .......... B60R 16/0237 |
| EP | 2746805 A1 | * | 6/2014 | ........... B60Q 3/0293 |

* cited by examiner

*Primary Examiner* — Daniel Pihulic
(74) *Attorney, Agent, or Firm* — Lawrence D. Hazelton

(57) ABSTRACT

An ultrasound interior space monitoring system for a motor vehicle includes at least one ultrasound transmitter and at least one ultrasound receiver that can be attached in the interior space of the motor vehicle and are configured for the contactless monitoring of the interior space. The system is operable in an operating mode which is active when a monitoring mode in which the monitoring of the interior takes place is inactive, wherein a position, a movement speed and/or a movement direction of an object, in particular of a hand of a vehicle occupant, can be determined and at least one fitting element of the vehicle can be actuated in dependence on the position, on the movement speed and/or on the movement direction by means of the at least one ultrasound transmitter and by means of the at least one ultrasound receiver in the operating mode.

23 Claims, 5 Drawing Sheets

ULTRASOUND INTERIOR SPACE MONITORING SYSTEM FOR A VEHICLE

CROSS-REFERENCE TO RELATED APPLICATION

This application claims the benefit under 35 U.S.C. §119 (a) of European Patent Application EP 12199077.4, filed Dec. 21, 2012, the entire disclosure of which is hereby incorporated herein by reference.

TECHNICAL FIELD OF INVENTION

This disclosure generally relates to an ultrasound interior space monitoring system for a motor vehicle, and more particularly relates to a system with an ultrasound transmitter and an ultrasound receiver that can be attached in the interior space of the motor vehicle and are configured for the contactless monitoring of the interior space.

BACKGROUND OF INVENTION

Such ultrasound interior space monitoring systems known from the prior art are used for monitoring the interior space when the vehicle is parked and possibly locked. Such systems have been proposed to detect if an infant has been inadvertently locked in a vehicle. However, when the vehicle is in operation (i.e. being driven by an operator), such interior space monitoring systems are normally deactivated so as not to trigger an unwanted alarm.

SUMMARY OF THE INVENTION

It is the underlying object of the present invention to provide an improved ultrasound interior space monitoring system for a motor vehicle which can satisfy a further function, in addition to the interior space monitoring, with high reliability in a motor vehicle.

In accordance with one embodiment, an ultrasound interior space monitoring system for a motor vehicle is provided. The system includes an ultrasound transmitter and an ultrasound receiver operable to detect a gesture by a hand of a vehicle occupant. The system also includes a vehicle device configured to be operated in response to the gesture detected by the ultrasound transmitter and the ultrasound receiver.

In accordance with one embodiment, an ultrasound interior space monitoring system for a motor vehicle comprises at least one ultrasound transmitter and at least one ultrasound receiver which can be attached in the interior space of the motor vehicle and are configured for the contactless monitoring of the interior space, wherein the ultrasound interior space monitoring system is operable in an operating mode that is active when a monitoring mode in which the monitoring of the interior takes place is inactive. The system is configured so a position, a movement speed and/or a movement direction of an object, in particular of a hand of a vehicle occupant, can be determined. A vehicle device of the vehicle can be operated based on the position, on the movement speed and/or on the movement direction indicated by the at least one ultrasound transmitter and of the at least one ultrasound receiver in the operating mode.

An unwanted operation of the vehicle device by the ultrasound interior space monitoring system in accordance with the invention can be simply and reliably avoided since, beside the position, the movement direction and the movement speed can additionally be used as further criteria for the operation of the vehicle device.

The at least one ultrasound transmitter and the at least one ultrasound receiver are preferably operable in a pulse-echo operating mode and/or in a Doppler operating mode. On the operation of the ultrasound interior space monitoring system in one of the two aforesaid operating modes, the movement speed and the movement direction of the object can be determined in a simple manner in addition to the position.

In accordance with a preferred further development of the invention, the ultrasound interior space monitoring system can switch over the at least one ultrasound transmitter and the at least one ultrasound receiver from a pulse-echo operating mode into a Doppler operating mode as soon as the object is located within a spatial zone provided for operating the vehicle device. The energy consumption is smaller in the pulse-echo operating mode since ultrasonic pulses are transmitted in time intervals, whereas ultrasound waves are continuously transmitted in the Doppler operating mode. In contrast, in the Doppler operating mode, a better spatial resolution of the position of the object is possible since ultrasound waves reflected by the object can be continuously received. It is therefore advantageous to use the Doppler operating mode as soon as the object is located in the spatial zone within which the vehicle device should be operable by hand, for example.

The at least one ultrasound transmitter and the at least one ultrasound receiver are preferably operable at a fixed pulse repetition rate in a pulse-echo operating mode, in particular for determining the movement speed and/or the movement direction of the object. The pulse repetition rate is preferably adjustable in dependence on the movement speed of the object, whereby a sufficiently accurate resolution for the position determination can be achieved even with comparatively high movement speeds of the object.

The vehicle device can preferably only be operated when the position of the object lies within a predetermined spatial zone and/or when the movement speed of the object lies within a predefined speed interval and/or when the movement direction of the object only differs from a predefined movement direction within a tolerance range. An unwanted operation of the vehicle device can thus be avoided in a simple manner.

The ultrasound interior space monitoring system can be configured to determine a gesture by means of positions and/or movement speeds and/or movement directions of the object determined after one another in time. It is particularly advantageous in this respect if the ultrasound interior space monitoring system only operates the vehicle device when the determined gesture corresponds to a gesture associated with the vehicle device for its operation.

More complex gestures can also be recognized by taking account of the movement speed and of the movement direction. It is thus possible that a number of different gestures can be defined and recognized so that a plurality of different vehicle devices in the vehicle can be operated selectively by recognizing the gesture associated with a respective vehicle device.

A plurality of ultrasound transmitters and/or a plurality of ultrasound receivers can be provided which can be controlled sequentially or in parallel, in particular in the pulse-echo operating mode, for determining the position of the object. The position, movement speed and movement direction of the object can be detected more precisely by means of a plurality of ultrasound transmitters and/or by means of a plurality of ultrasound receivers.

One ultrasound transmitter and a plurality of ultrasound receivers can be used, for example, to determine the position of the objects by triangulation. With most interior space monitoring systems known from the prior art, a plurality of ultrasound transmitters/receivers are anyway provided to achieve an improved coverage in the interior space. The use of these anyway present transmitters/receivers for operating an vehicle device therefore does not cause any additional costs, or only small additional costs.

The vehicle device preferably comprises an interior space lighting of the vehicle which is operable, in particular dimmable, in dependence on the position, movement speed and/or movement direction of the object.

In accordance with a preferred further development of the invention, the ultrasound inner space monitoring system is configured to take account of a temperature, in particular of the interior space, on the determining of the position, the movement speed and/or the movement direction of the object. The position, movement direction, and movement speed of the object can thus be determined particularly accurately on the basis of the temperature dependency of the speed of sound.

Provision can be made that an article lying on a seat of the vehicle can be detected. A camera system can thus be saved.

A warning signal can preferably be triggered and/or an vehicle device relevant to traffic safety can be operated after a detection of the article has taken place. A possible danger can thus be indicated to the vehicle occupant.

A roof module, in particular a roof module which can be installed in a headliner of the vehicle, is preferably provided in which the at least one ultrasound transmitter and the at least one ultrasound receiver are accommodated.

The ultrasound interior space monitoring system in accordance with the invention is in particular not only suitable for interior space monitoring in accordance with the above statements, but it can rather also be used for operating at least one vehicle device. In this respect, an unintentional operation of the vehicle device can in particular be avoided by gesture recognition. Furthermore, separate proximity switches can be saved which are known from the prior art for the contactless operation of vehicle devices.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

An ultrasound interior space monitoring system is generally used for monitoring the interior space of a vehicle when the vehicle is in a parking position and locked. In the present application, the respective mode of operation is called "monitoring mode". When the vehicle is in operation, an interior space monitoring system is normally deactivated. In other words, the monitoring mode is inactive or switched off. In general, the system is operable in a so-called "operating mode" in addition to the "monitoring mode". The operating mode is active when the monitoring mode is inactive. Thus, when the monitoring mode is switched off, the monitoring system is running in the operating mode in which a vehicle device of the vehicle can be operated.

Figure 1:
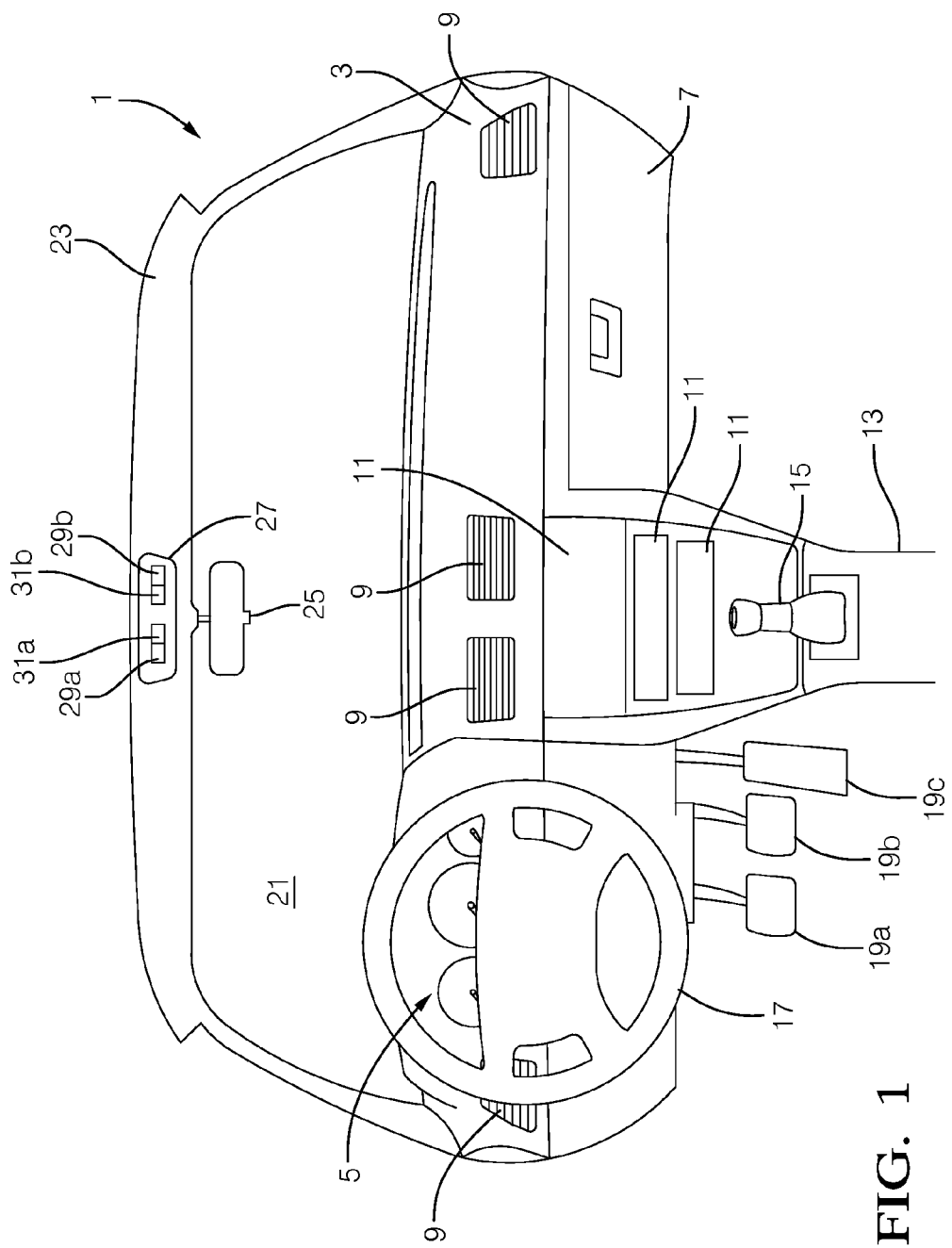
FIG. 1 is a cockpit of a vehicle with a roof module arranged in the headliner that includes an ultrasound interior space monitoring system in accordance with one embodiment.

FIG. 1 illustrates a non-limiting example of a vehicle interior, hereafter referred to as the cockpit 1. In general, the cockpit 1 includes a dashboard 3 having an instrument panel 5, a glove compartment 7, and air nozzles 9. A plurality of display devices and/or switching devices 11 such as an onboard computer, a radio, and switches for operating interior heating or ventilation are arranged at the center of the dashboard 3. A gear lever 15 projects from a center console 13. A clutch pedal 19a, a brake pedal 19a, and a gas pedal 19c are provided beneath the steering wheel 17. A windshield 21 extends above the dashboard 3 and is adjacent to a headliner 23.

The headliner 23 includes a roof module 27 positioned in front of the rear-view minor 25. In this example, the roof module 27 includes a left-hand lamp 29a and a right-hand lamp 29b. In general, the left-hand lamp 29a is provided for lighting the interior space on the driver side, and the right-hand lamp 29b is provided for lighting the interior space on the passenger side. In addition, the roof module 27 also includes a left-hand transmission/reception device 31a and a right-hand transmission/reception device 31b as part of an ultrasound interior space monitoring system 30. Each transmission/reception device 31a, 31b includes a transmitter 33 (FIG. 2) for transmitting pulses 37 of ultrasound waves and a receiver 35 for receiving the ultrasonic pulses 39 reflected back by, for example, a hand 41.

Figure 3:
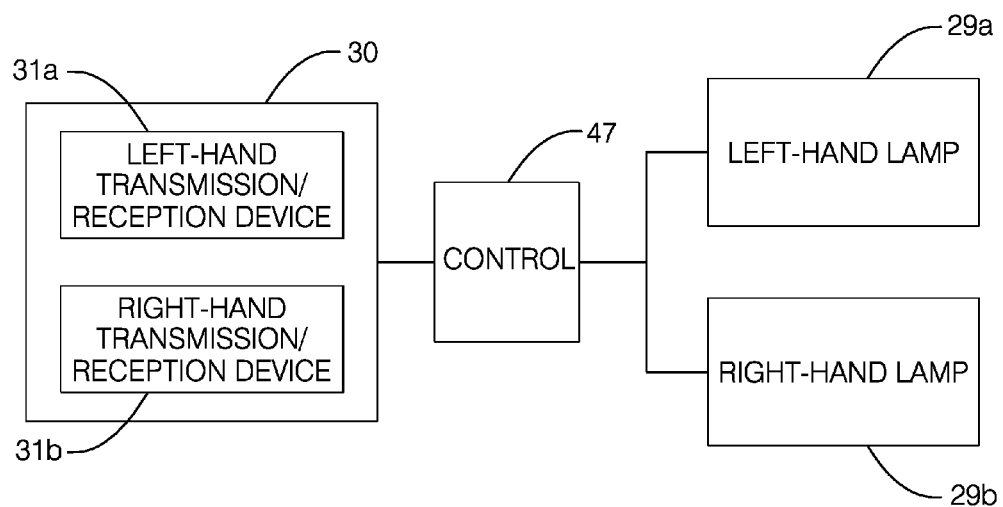
FIG. 3 is a simplified block diagram of the ultrasound interior space monitoring system in accordance with the invention of FIG. 1 which is connected via a control to lamps accommodated in the roof module in accordance with one embodiment.

The ultrasound interior space monitoring system 30 is operable in a monitoring mode in which the left-hand and the right-hand transmission/reception devices 31a, 31b are used in a known manner for contactless monitoring of the interior space of the vehicle (the cockpit 1). In addition, the ultrasound interior space monitoring system 30 is operable in an operating mode which is active with an inactive monitoring mode. In the operating mode, the left-hand lamp 29a can be operated by means of the left-hand transmission/reception device 31a and the right-hand lamp 29b can be operated by means of the right-hand transmission/reception device 31b. The ultrasound interior space monitoring system 30 thus satisfies a dual function since it is not only provided for interior space monitoring, but also for operating the lamps 29a, 29b. In this respect, the ultrasound interior space monitoring system 30 is coupled to the lamps 29a, 29b via a control 47 (cf. FIG. 3). The operation of the lamps 29a, 29b thus takes place indirectly via the control 47 which can be a central control of the vehicle. Alternatively, the ultrasound interior space monitoring system 30 can be directly coupled to the lamps 29*a*, 29*b* so that they can be controlled directly by the ultrasound interior space monitoring system 30.

Figure 2:
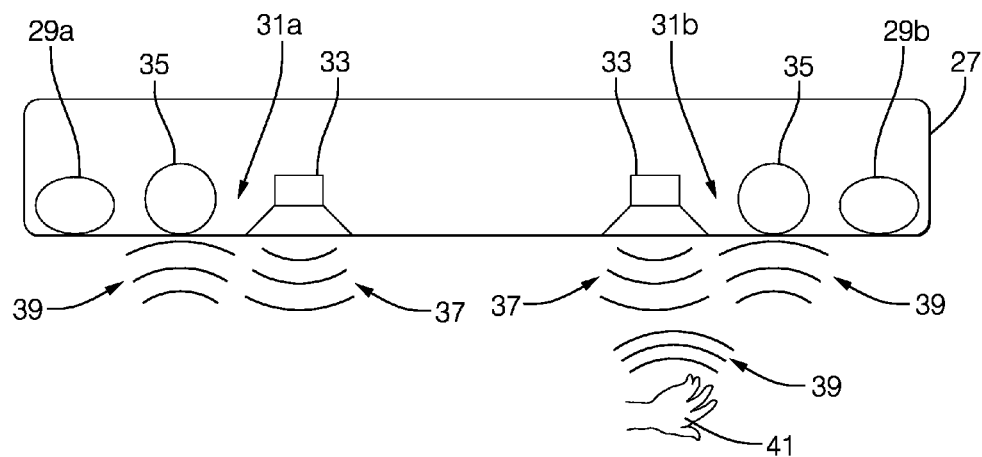
FIG. 2 is a diagram of the roof module of the cockpit of FIG. 1 in accordance with one embodiment.
Figure 4A:
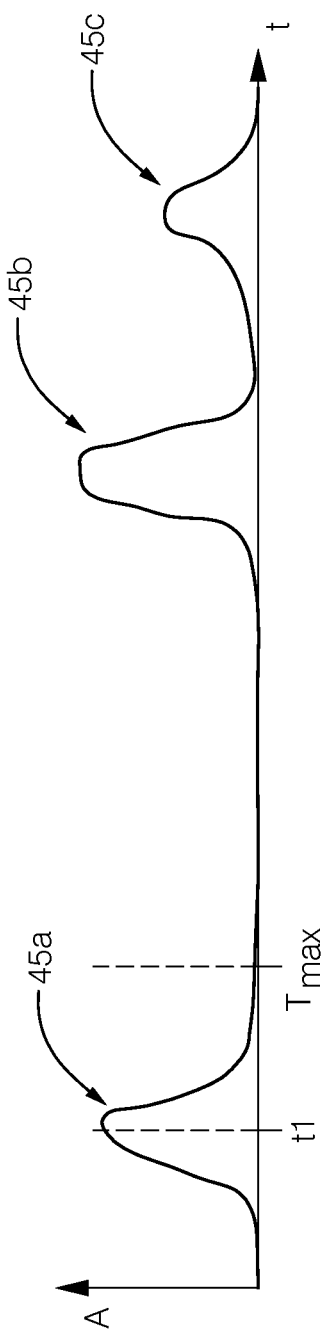
FIG. 4A is a graph of signals illustrating the function of the ultrasound interior space monitoring system in accordance with one embodiment.

In the following, the function of the ultrasound interior space monitoring system 30 in the operating mode will be explained in more detail. In order, for example, to operate the right-hand lamp 29*b*, the occupant holds his hand 41 in front of the right-hand transmission/reception device 31*b*, as is shown in FIG. 2. In the diagram of FIG. 4A, the amplitude A of received pulses 45*a*, 45*b* and 45*c* is shown as a function of the time t for the right-hand transmission/reception device 31*b*. In this respect, the pulses 45*a*, 45*b* and 45*c* are each transmitted by the transmission/reception device 31*b* at the time t=0 so that the time axis indicates the transit time of the pulses. The pulse 45*a* originates from a reflection by the hand 41, whereas the pulse 45*b* is based on a reflection at the body of the occupant and the pulse 45*c* is based on a reflection at another reflection such as a vehicle seat.

The ultrasound interior space monitoring system 30 is configured to compare the transit time of a received pulse with a maximum transit time Tmax and, if the maximum speed Tmax is not reached, to operate that lamp 29*a*, 29*b* which is associated with the transmission/reception device which has received the pulse. Since the hand 41 is held at a comparatively small distance in front of the transmission/reception device 31*b*, the transit time t1 of the pulse 45*a* is correspondingly short. The transit time t1 of the pulse 45*a* is therefore smaller than the maximum transit time Tmax so that the right-hand lamp 29*b* is operated while using the control 47. The maximum transit time Tmax is selected so short in this respect that the right-hand lamp 29*b* is not operated by the pulses 45*b* and 45*c*.

Figure 4B:
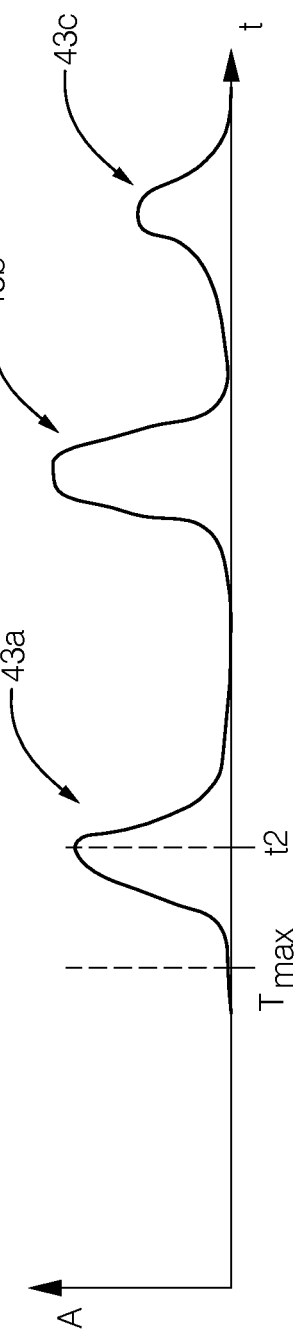
FIG. 4B is another graph of signals illustrating the function of the ultrasound interior space monitoring system in accordance with one embodiment.

The diagram of FIG. 4*b* shows the amplitude A of pulses 43*a*, 43*b* and 43*c* as a function of time, with the pulses 43*a*, 43*b* and 43*c* being transmitted and received again by the left-hand transmission/reception device 31*a*. The pulse 43*a* is based on a reflection by the hand 41 which is held in front of the right-hand transmission/reception device 31*b* (cf. FIG. 2), whereas the pulse 43*b* originates from a reflection at the body of the occupant and the pulse 43*c* originates from a reflection at the reflector. As is shown in FIG. 4B, the transit time t2 of the pulse 43*a* is larger than the maximum transit time Tmax so that no operation of the left-hand lamp 29*a* is effected by the pulse 43*a*. The same applies accordingly to the pulses 43*b* and 43*c*.

The maximum transit time Tmax is selected so that the respective lamp 29*a*, 29*b* is only operated when the hand 41 is held at a small spacing in front of the respective transmission/reception device 31*a*, 31*b* associated with the lamp 29*a*, 29*b*. An unintentional operation of the lamps 29*a*, 29*b* can thus be avoided.

In an alternative embodiment, the detected transit times are converted into distance values. In this respect, an operation of the lamps 29*a*, 29*b* takes place in the same way as with reference to the transit times when a specific maximum distance is not reached.

Provision can be made that the brightness of the light transmitted from a lamp 29*a*, 29*b* is set in dependence on the transit time or in dependence on a determined distance value. The brightness of the light of the lamp 29*b* is thus increased, for example, as the transit time t1 become shorter and is decreased as the transit time t1 increases.

Provision can moreover be made that a speed of the moving hand 41 is measured by means of each transmission/reception device 31*a*, 31*b* so that the lamps 29*a*, 29*b* can be regulated in dependence on the speed.

The transmission/reception devices 31*a*, 31*b* can also be used for detecting movements. A movement can, for example, be detected in whose course the occupant first holds his hand 41 in front of the left-hand transmission/reception device 31*a*, then in front of the right-hand transmission/reception device 31*b* and then again in front of the left-hand transmission/reception device 31*a*. Such a movement can be compared with predefined gestures by the interior space monitoring system 30. If the detected movement coincides with a specific gesture, the lamps 29*a*, 29*b* can be operated in a specific manner associated with the gesture. The lamps 29*a*, 29*b* can, for example, be switched off by the above-described movement.

The transmission/reception devices 31*a*, 31*b* can also be used for detecting articles. For example, an article lying on a vehicle seat can be detected using the signals reflected back (cf. FIGS. 4A and 4B), in particular in that an additional pulse originating from the article is detected which lies, for example, between the pulses 45*b* and 45*c* or 43*b* and 43*c* respectively. On the detection of such a pulse, a warning signal can be output and the occupant's attention can thus be brought to the article.

The variant of an ultrasound interior space monitoring system 30 in accordance with the invention described with reference to FIGS. 5 to 7 has an ultrasound transmitter 33 and an ultrasound receiver 35 and is operable with an inactive monitoring mode in an operating mode in which a lamp 29*a* can be operated.

The ultrasound transmitter 33 and the ultrasound receiver 35 are operable in a pulse-echo operating mode in which pulses 37 are transmitted in a time sequence by the ultrasound transmitter 33 which can be reflected, for example, at a hand 41 of a vehicle occupant and which can be received as pulses 39 reflected back by the ultrasound receiver 35.

Figure 5:
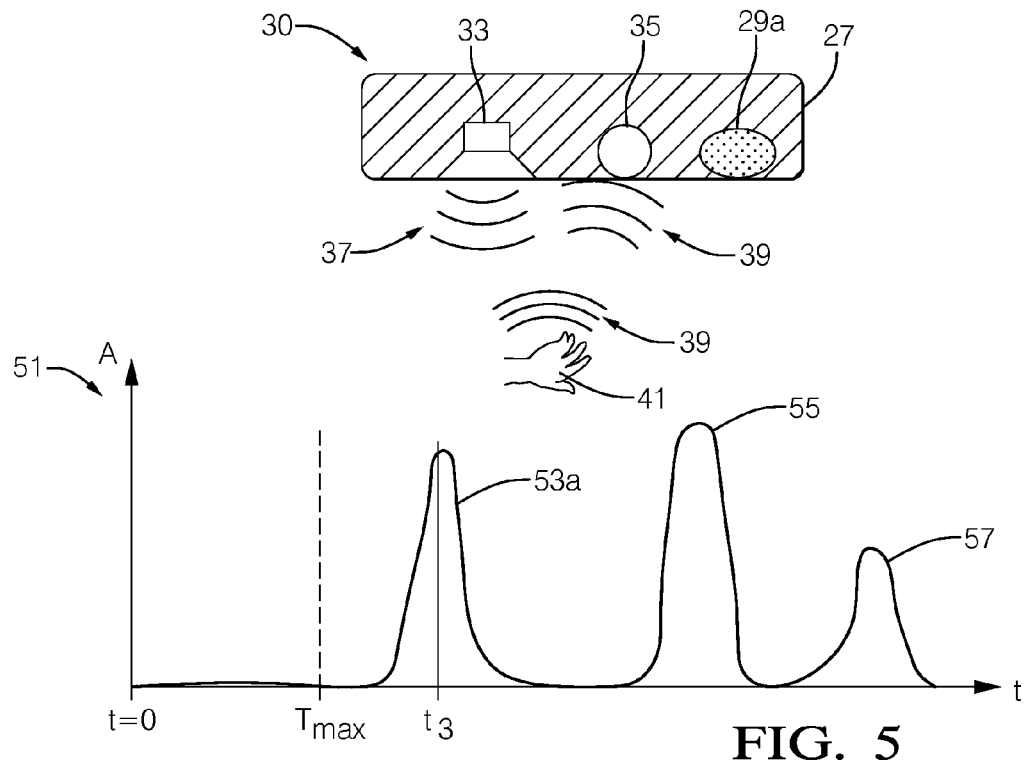
FIGS. 5, 6, and 7 are representations for illustrating the function of a further ultrasound interior space monitoring system in accordance with one embodiment.

The diagram 51 imaged in FIG. 5 shows the amplitude curve A of ultrasonic pulses received by the ultrasound receiver 35 over the time t which originate from an ultrasonic pulse transmitted by the ultrasound transmitter 33 at the time t=0. The time axis thus indicates the transit time of the pulses. As the diagram 51 shows, an ultrasonic pulse 53*a* reflected back by the hand 41 is received at the time t3, whereas ultrasound pulses 55, 57 reflected back by the body of the occupant or from a vehicle seat are received at later times. The transit time t3 of the ultrasonic pulse 53*a* is a measure for the distance of the hand 41 from the roof module 27 in which the ultrasound transmitter 33 and the ultrasound receiver 35 are accommodated so that the distance between the roof module 27 and the hand 41 can be determined from the transit time t3 and from the speed of sound (approximately 343 m/s in air).

Figure 6:
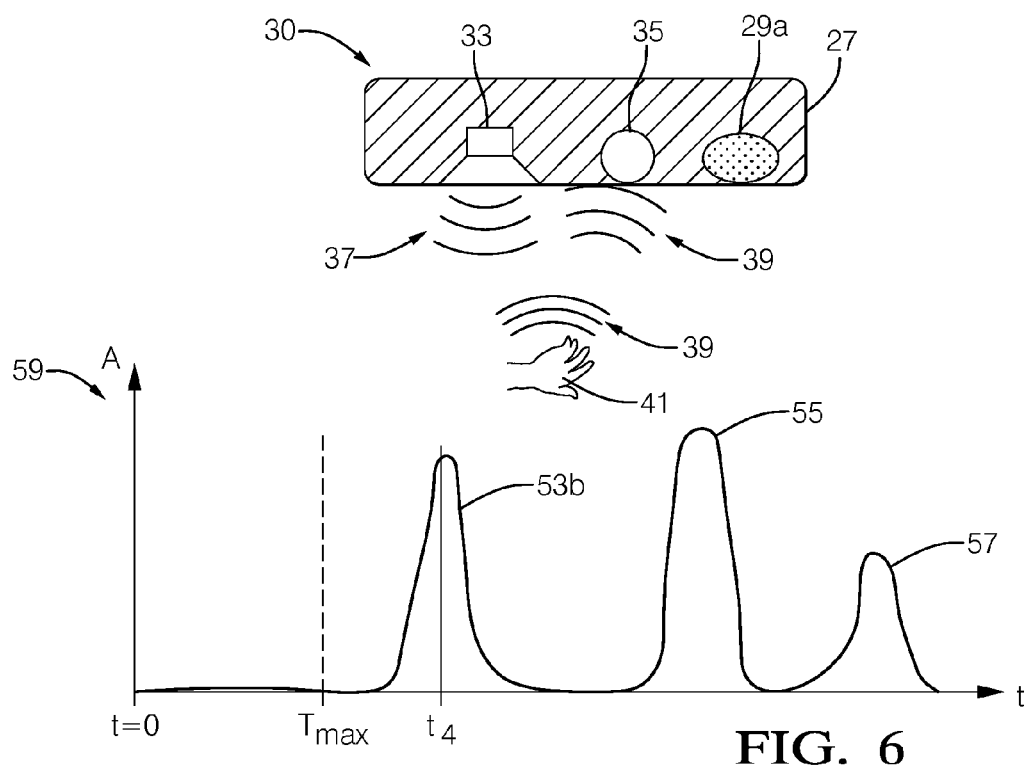

In the representation shown in FIG. 6, the hand 41 has come further closer to the roof module 27. The corresponding transit time t4 of the pulse 53*b* reflected back by the hand 41 has therefore become shorter, cf. the diagram 59 in FIG. 6.

Figure 7:
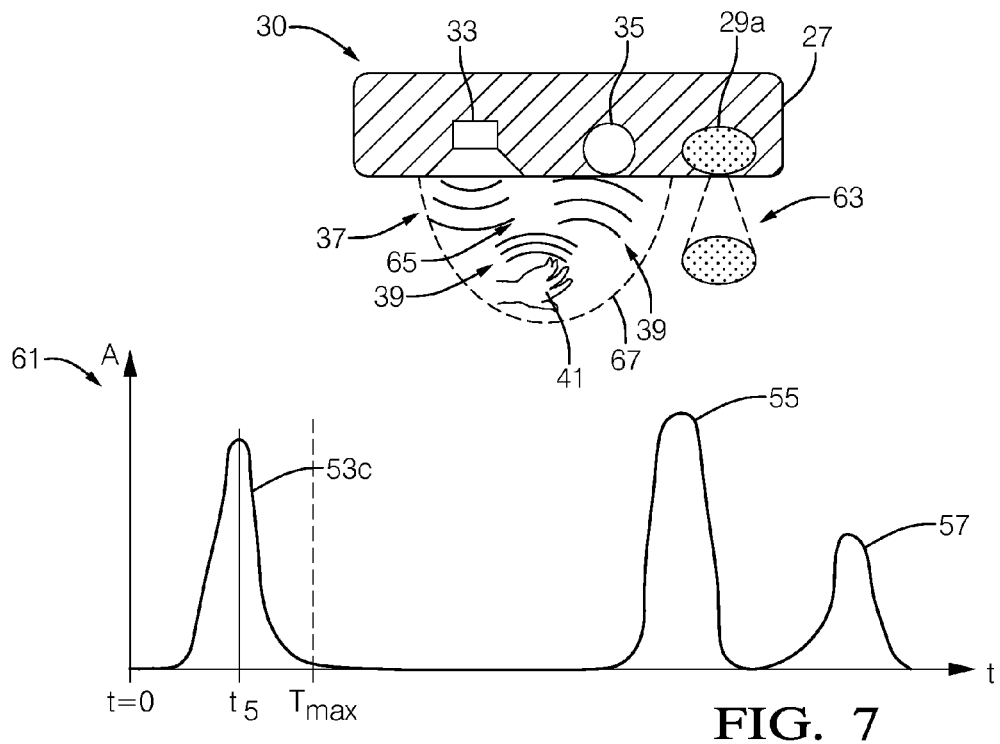

In the representation shown in FIG. 7, the hand 41 has come even closer to the roof module 27, whereby the transit time t5 of the pulse 53*c* reflected back by the hand 41 is shortened even more, cf. the diagram 61 in FIG. 7.

The ultrasound interior space monitoring system 30 can be configured so that the lamp 29*a* is switched on as soon as the transit time of a pulse reflected back is smaller than a predefined maximum transit time Tmax. The distance of the hand 41 thus has to be below a predefined maximum distance or the hand 41 has to be located within a predefined spatial zone 65 correlated with the maximum transit time Tmax and disposed beneath the roof module 27 (cf. FIG. 7 with the boundary line 67 of the spatial zone 65 drawn with dashed lines) to operate the lamp 29*a*.

As is shown in diagram 61 of FIG. 7, the transit time 15 is below the maximum transit time Tmax so that the lamp 29a is switched on in the position of the hand 41 shown in FIG. 7 (cf. the drawn light cone 63), whereas the lamp 29b is still switched off in the position of the hand 41 shown in FIG. 6.

The time duration T between two successively transmitted ultrasonic pulses is known in the ultrasound interior space monitoring system 30. The time duration T corresponds to the inverse of the pulse repetition rate 1/T. Furthermore, for example, the pulses 53a and 53b which are reflected back and which are shown in the diagrams 51 and 59 originate from two pulses output after one another. The distance S by which the hand 41 has moved during the time duration T can be determined from the difference of the transit times t4 and t3 and the speed of sound. The movement speed V of the hand 41 can then be calculated from the determined distance and the inverse pulse repetition rate, V=S/T. That is, V=0.2 m/s results, for example, at T=50 ms and S=1 cm.

Furthermore, it can be determined whether the hand 41 is moving toward or away from the roof module 27 using the sign that results on the formation of the difference between the transit times t4 and t3. The movement direction of the hand 41 can thus be determined.

In addition, the pulse repetition rate can, for example, be changed in dependence on the determined movement speed. A higher spatial resolution is thereby in particular achieved at higher movement speeds.

The ultrasound interior space monitoring system 30 can thus not only determine the position of the hand 41 beneath the roof module 27, but also the movement speed and the movement direction of the hand 41. It thereby becomes possible that the lamp 29a cannot only be operated in dependence on the signal transit time or on the determined distance, but also in dependence on the movement speed and on the movement direction of the hand 41. For example, in addition to the above-mentioned criterion for switching on the lamp 29a, according to which the distance of the hand 41 from the roof module 27 has to fall below a predefined maximum spacing, it can be presupposed that the movement speed of the hand 41 is larger than a predefined minimal speed and that the movement direction of the hand 41 is directed in the direction of the roof module 27.

In the variant described with reference to FIGS. 5 to 7, the transmitter 33 and the receiver 35 form a sound circle since the ultrasonic pulses transmitted by the transmitter 33 are detected by the receiver 35. In contrast, the variant of an ultrasound interior space monitoring system 30 in accordance with the invention described with reference to FIGS. 2, 4A and 4B has two sound circles, with a respective one sound circle being formed by a respective one of the two transmission/reception devices 31a, 31b. The movement direction of the hand 41 can be determined more exactly using the two sound circles than is possible with only one sound circle. It can, for example, be determined using the two sound circles whether the hand 41 shown in FIG. 2 is being moved toward the roof module 2 from below or from the side. The lamp 29b can then only be operated by a hand movement from below. A detected approach from the side, which originates, for example, from a movement of the occupant's head toward the rear-view mirror 25, thus does not result in an unintentional operation of the lamp 29b.

A plurality of ultrasound circles can be used to determine the position of, for example, a hand of a vehicle occupant even more exactly, for example by triangulation. The movement direction and movement speed of the hand can likewise be determined even more exactly on the basis of a more exact position determination. An erroneous operation of a vehicle devices can thus easily be avoided. In addition, a gesture carried out by the hand of an occupant can be determined particularly simply and exactly in that a time sequence of determined positions, movement speeds, and movement directions of the hand is detected by a plurality of ultrasound circles. It is furthermore possible that an vehicle device can only be operated when the gesture carried out corresponds to a gesture associated with the respective vehicle device.

The ultrasound circles can be controlled alternately or in parallel. A plurality of ultrasound circles can, for example, be realized by means of one ultrasound transmitter and a plurality of ultrasound receivers. A plurality of ultrasound circles can also be realized by a plurality of transmitter/receiver pairs.

Figure 8:
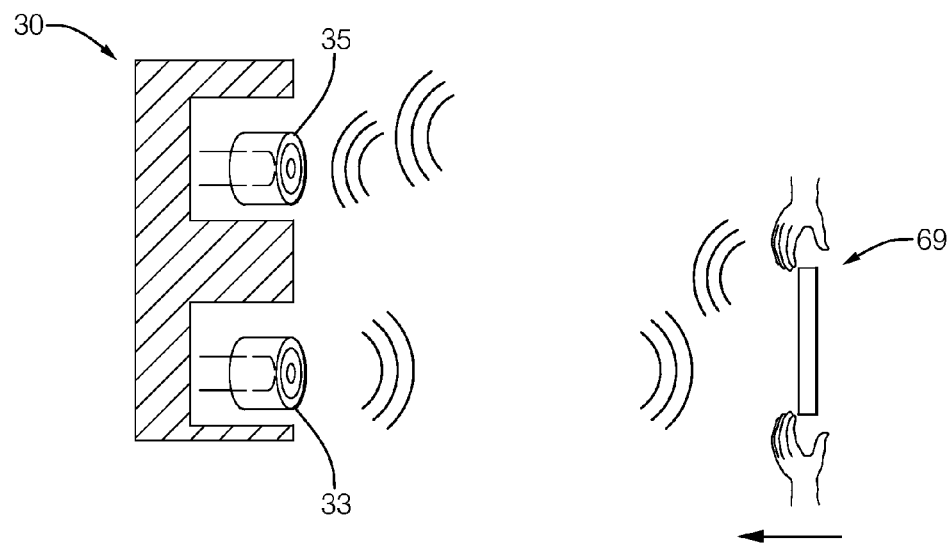
FIG. 8 is a representation for illustrating the function of yet another ultrasound interior space monitoring system accordance with one embodiment.

In the variant shown in FIG. 8 of an ultrasound interior space monitoring system 30, the ultrasound transmitter 33 and the ultrasound receiver 35 work in a Doppler operating mode in which the transmitter 33 transmits a continuous ultrasonic signal having a basic frequency. The signal arriving at the receiver 35 contains a Doppler signal whose frequency is shifted with respect to the basic frequency in dependence on the movement speed and movement direction of an object 69 at which the signal was reflected. The movement speed and the movement direction of the object 69, which can only be the hand of an occupant, can be determined in a manner known per se using the frequency of the Doppler signal. The spatial resolution can, in an analog manner as described above, also be increased by the use of a plurality of sound circles in a Doppler measurement, whereby the movement direction of the object 69 can in particular be determined more exactly.

The transmitter 33 and the receiver 35 of an ultrasound interior space monitoring system in accordance with the invention can be operable both in the pulse-echo operating mode and in the Doppler operating mode. In this respect, it is preferred that the transmitter 33 and the receiver 35 are operated for so long in the pulse-echo operating mode until an object (cf. the hand 41 in FIG. 7) is located within a defined spatial zone in the environment of the transmitter 33 or of the receiver 35 (cf. the spatial zone 65 in FIG. 7). Only then are the transmitter 33 and the receiver 35 switched over into the Doppler operating mode in which a better spatial resolution can be achieved.

While this invention has been described in terms of the preferred embodiments thereof, it is not intended to be so limited, but rather only to the extent set forth in the claims that follow.

We claim:

1. An ultrasound interior space monitoring system for a motor vehicle, said system comprising:
   an ultrasound transmitter and an ultrasound receiver operable to detect a gesture by a hand of a vehicle occupant, wherein the ultrasound transmitter and the ultrasound receiver are operable in a pulse-echo operating mode and a Doppler operating mode, wherein the ultrasound transmitter and the ultrasound receiver are switched from the pulse-echo operating mode to the Doppler operating mode when the hand is located within a spatial zone for operating the vehicle device; and
   a vehicle device configured to be operated in response to the gesture detected by the ultrasound transmitter and the ultrasound receiver.

2. The system in accordance with claim 1, wherein the ultrasound transmitter and the ultrasound receiver are operable at a fixed pulse repetition rate in a pulse-echo operating mode to detect the gesture.

3. The system in accordance with claim 2, wherein the pulse repetition rate is adjusted based on a movement speed of the hand.

4. The system in accordance with claim 1, wherein the vehicle device is only operated when the gesture is characterized by one of: a position of the hand is within a predefined spatial zone, a movement speed of the hand is within a predefined speed interval, and a movement direction of the hand differs from a predefined movement direction within a tolerance range.

5. The system in accordance with claim 1, wherein the system is configured to determine a gesture based on a position of the hand, a movement speed of the hand, and a movement direction of the hand, wherein the position, the movement speed, and the movement direction are determined after one another in time.

6. The system in accordance with claim 5, wherein system is configured only to operate the vehicle device when the detected gesture corresponds to a gesture associated with the vehicle device.

7. The system in accordance with claim 1, wherein the system includes one of a plurality of ultrasound transmitters and a plurality of ultrasound receivers that are controllable sequentially or in parallel while operating in the pulse-echo operating mode to determine a position of the hand.

8. The system in accordance with claim 1, wherein the vehicle device includes a light configured for lighting an interior space of the vehicle, wherein the light is dimmed based on one of a position of the hand, a movement speed of the hand, and a movement direction of the hand.

9. The system in accordance with claim 1, wherein the system takes account of temperature when the gesture is detected.

10. An ultrasound interior space monitoring system for a motor vehicle, said system comprising:
at least one ultrasound transmitter and at least one ultrasound receiver located in an interior space of a motor vehicle and configured for the contactless monitoring of an interior space of the motor vehicle, wherein the system is operable in an operating mode characterized as active when a monitoring mode in which the monitoring of the interior space takes place is inactive,
wherein one of a position, a movement speed, and a movement direction of an object is determined in the operating mode by the at least one ultrasound transmitter and the at least one ultrasound receiver, wherein at least one vehicle device of the vehicle is operable based on the one of the position, the movement speed, and the movement direction.

11. The system in accordance with claim 10, wherein the at least one ultrasound transmitter and the at least one ultrasound receiver are operable in a pulse-echo operating mode and a Doppler operating mode.

12. The system in accordance with claim 10, wherein the system switches the at least one ultrasound transmitter and the at least one ultrasound receiver from a pulse-echo operating mode to a Doppler operating mode if the object is located within a spatial zone provided for operating the vehicle device.

13. The system in accordance claim 10, wherein the at least one ultrasound transmitter and the at least one ultrasound receiver are operable at a fixed pulse repetition rate in a pulse-echo operating mode to determine one of the movement speed and the movement direction of the object.

14. The system in accordance with claim 13, wherein the pulse repetition rate is adjustable in dependence on the movement speed of the object.

15. The system in accordance with claim 10, wherein the vehicle device is only operated when one of the position lies within one of a predefined spatial zone, the movement speed lies within a predefined speed interval, and the movement direction only differs from a predefined movement direction within a tolerance range.

16. The system in accordance with claim 10, wherein the system is configured to determine a gesture with reference the position, the movement speed, and the movement direction of the object determined after one another in time.

17. The system in accordance with claim 16, wherein the system is configured only to operate the vehicle device when the determined gesture corresponds to a gesture associated with the vehicle device.

18. The system in accordance with claim 10, wherein a plurality of ultrasound transmitters and/or a plurality of ultrasound receivers are provided which are controllable sequentially or in parallel in the pulse-echo operating mode to determine the position of the object.

19. The system in accordance with claim 10, wherein the vehicle device comprises an interior space lighting of the vehicle which is dimmable in dependence on the position, movement speed and/or movement direction of the object.

20. The system in accordance with claim 10, wherein the system takes account of the temperature of the interior space in the determination of the position, movement speed and/or movement direction of the object.

21. The system in accordance with claim 10, wherein an article lying on a seat of the vehicle can be detected.

22. The system in accordance with claim 21, wherein the system is configured to trigger a warning signal in response to a detection of the article has taken place.

23. The system in accordance with claim 10, wherein the system includes a roof module configured to be installed in a headliner of the vehicle and in which the at least one ultrasound transmitter and the at least one ultrasound receiver are accommodated.

* * * * *